Patented Mar. 15, 1927.

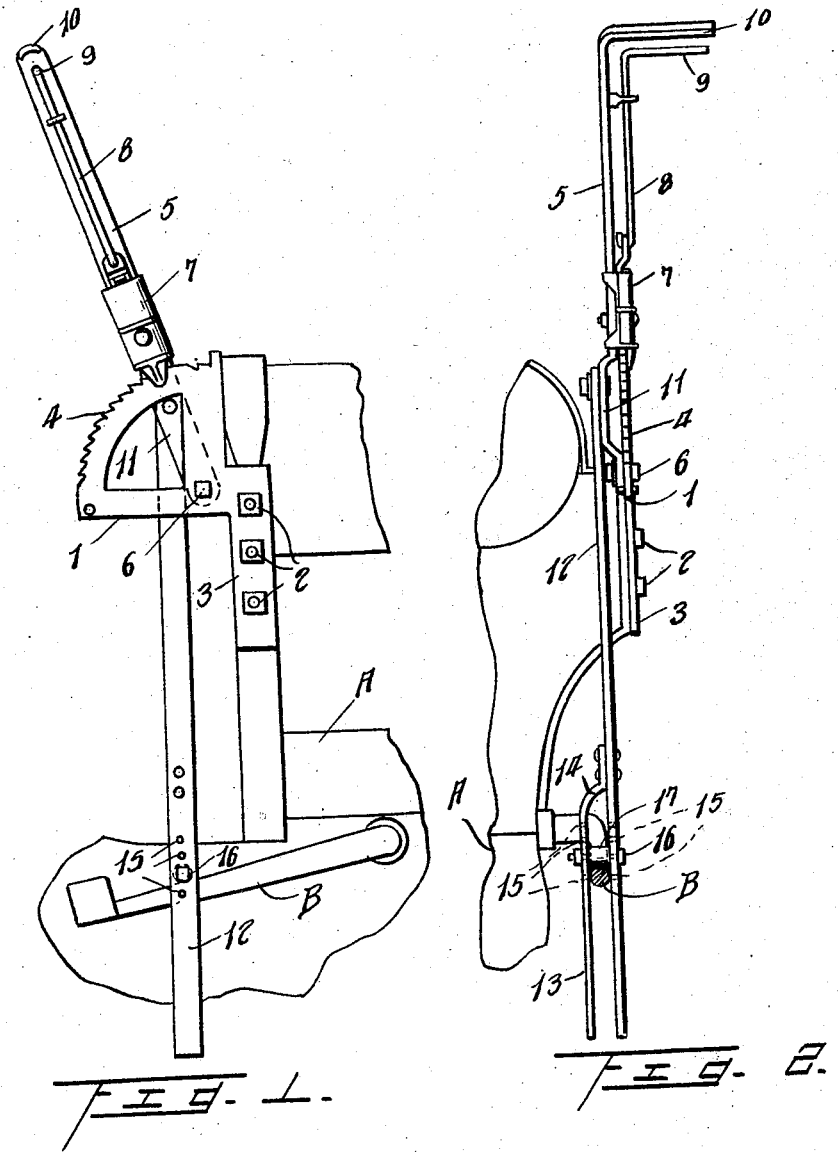

1,621,427

UNITED STATES PATENT OFFICE.

FRANK O. PEASLEY, OF NEW HAMPTON, MISSOURI.

CLUTCH-CONTROL MECHANISM FOR TRACTORS.

Application filed September 19, 1925. Serial No. 57,378.

The invention relates to manually operated means for controlling the clutch of a tractor.

A certain type of tractor that is now on the market and very largely used is so constructed that the transmission gearing may be left in gear and the clutch released and the tractor will stand on either level or sloping ground, or if the gears are released irrespective of the position of the clutch the tractor will stand on level ground. No means however is provided by which the tractor may be stopped on a hillside or sloping ground and the engine left running and the gears in mesh unless the operator is on the tractor and holds the clutch in a released position.

This invention has for its principal object the provision of means by which the engine may be permitted to run and the gears may be in mesh and the clutch held in released position without the presence of the operator on the tractor to actuate the clutch pedal so that the tractor may be stopped on any surface either level or sloping.

To this end the invention comprises a bracket carrying a lever with an operating rod pivotally secured thereto and adapted to engage the tractor clutch pedal, and provided with means for holding the lever in position to maintain the clutch in a released position.

The invention will be described in detail hereinafter and will be found illustrated in the accompanying drawing, in which:

Figure 1 is a side view of a fragment of a tractor showing the improved clutch control mechanism in place thereon, and Figure 2 a rear view, the clutch pedal being shown in transverse section.

In the drawing similar reference characters will be used to designate corresponding parts in both of the views.

A tractor is shown fragmentally at A, and has a bracket 1 secured to the frame thereof by means of bolts or other suitable fastenings 2 secured to a downwardly extending arm 3 integral with said bracket 1. The bracket 1 is also provided with a ratchet face 4. Fulcrumed on the bracket 1 is a lever 5, 6 indicating the fulcrum of said lever, and 7 is a thumb latch mounted on the lever and actuated by an L-shaped rod 8 having its angular end 9 conveniently located under the angular end 10 of the lever.

Lever 5 has an offset portion 11 to which is pivotally secured a rod 12 extending downwardly and having adjacent to its lower end another rod 13 secured thereto through an offset end 14. The construction of the lower end of the rod 12 with the rod 13 provides a forked structure, the two fingers of the fork formed by the lower end of the rod 12 and the rod 13 engaging on opposite sides of the clutch pedal B of the tractor A.

Rods 12 and 13 are provided with series of openings 15 to selectively receive a pin 16, and 17 is a roller mounted on said pin 16 and engaging the pedal B.

It will be apparent that with the clutch control mechanism above described installed on the tractor shown the clutch pedal B may be operated to release the clutch by actuating the lever 5, the thumb latch 7 holding the lever in adjusted position, and with the clutch mechanism installed the engine of the tractor may be left running and the tractor in gear to run the driving wheel on sloping ground so that the presence of the operator of the tractor will not be necessary to hold the clutch pedal in released position. It will be furthermore understood that by providing a series of openings 15 in the rods 12 and 13 the pin 16 and roller 17 may be adjusted to properly fit and engage the clutch pedal B.

What is claimed is:

A clutch control mechanism for tractors, comprising a bracket, a downwardly extending arm thereon adapted to be secured to the frame of a tractor, a segmental ratchet on said bracket, a lever fulcrumed on said bracket, a thumb latch carried by said lever and adapted to engage said ratchet, a rod pivotally secured to said lever, another rod having an offset end secured to the first mentioned rod and forming a forked member to enclose the clutch pedal of the tractor between its fingers, and a pin bridging the space between said rods and adapted to engage the pedal, said rods being provided with a plurality of oppositely disposed openings for adjusting the position of said pin.

In testimony whereof I affix my signature.

FRANK O. PEASLEY.